2 Sheets--Sheet 1.

J. W. ELLS & J. J. DEABOLD.

Glass-Furnaces.

No. 128,716.   Patented July 9, 1872.

Witnesses—
Geo. C. Stewart
John D. Moreland

Inventors—
Josiah W. Ells
John J. Deabold

2 Sheets--Sheet 2.
J. W. ELLS & J. J. DEABOLD.
Glass-Furnaces.
No. 128,716. Patented July 9, 1872.
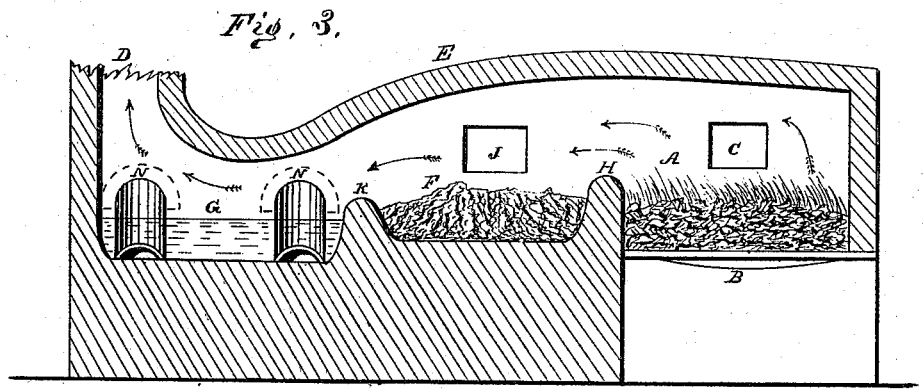
Witnesses
George C. Stewart
N. C. Price
Inventors
Josiah W. Ells
John J. Deabold 128,716

UNITED STATES PATENT OFFICE.

JOSIAH W. ELLS AND JOHN J. DEABOLD, OF PITTSBURG, PENNSYLVANIA, ASSIGNORS OF ONE-THIRD OF THEIR RIGHT TO GEORGE C. STEWART, OF SAME PLACE.

IMPROVEMENT IN GLASS-FURNACES.

Specification forming part of Letters Patent No. 128,716, dated July 9, 1872.

*To all whom it may concern:*

Figure 1:
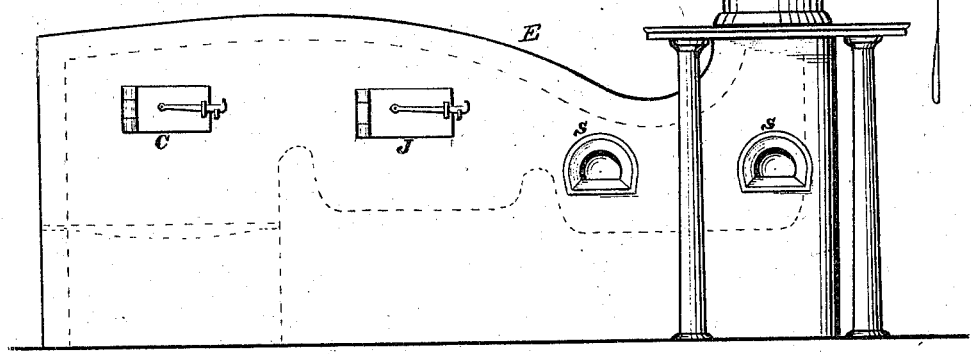
Figure 2:
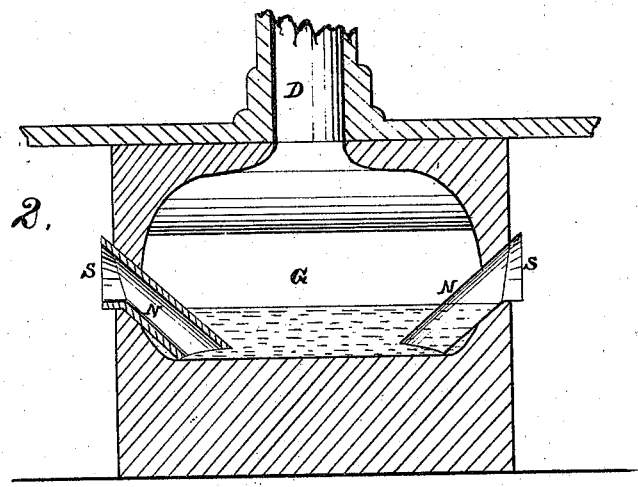

Be it known that we, JOSIAH W. ELLS and JOHN J. DEABOLD, of Pittsburg, in the county of Allegheny and State of Pennsylvania, have invented a new and useful Improvement in Glass-Furnaces, which invention will be readily understood by the following description, taken in connection with the accompanying drawing therein:

Figure 1 represents a side elevation of our improved glass-furnace; Fig. 2, a transverse vertical section of that portion immediately beneath the chimney; Fig. 3, longitudinal vertical section of the body of the furnace.

We construct our furnace in shape similar to those used for puddling iron, &c., wherein the fire-box A, with its grate B and fuel-door C, is placed at one end, and the chimney D at the other, and with the crown E of the furnace gradually sloping, so as to be lower at that point next the chimney D than at that part over the fire-box, by which the flame and consequent heat on its way to the exit-flue is given a downward inclination, and thereby made to impinge against, cut, and rapidly reduce to a state of fusion any glass-forming material that may be placed therein. The body of the furnace, between the fire-box and chimney, consists of two compartments, of different depths, the one next the fire-box constituting the batch-chamber F, and the other, nearest the chimney, the working-basin G. The batch-chamber has its bottom on or about the same horizontal plane as the grate-bars, and is separated from the fire-box by a high bridge-wall, H, extending entirely across the furnace, which tends to prevent large particles of fuel from passing directly into the batch, and also keeps the batch of glass from entering the fire. This chamber is also provided with a door, J, leading thereinto from the outside, for the purpose of introducing the batch, ladling the glass, &c., as the circumstances may require. The bottom of the working-basin G is somewhat lower than that of the batch-chamber, the two being divided by a low wall, *k*, so as to keep the glass-forming material back until thoroughly melted, when it may be allowed to flow over into the basin below, or scooped over, as often as may be found necessary to maintain therein a sufficiency of workable glass. The glass, when it arrives in the working-basin, and in a thorough state of fusion, is ready to be taken out and molded or blown into any of the numerous articles manufactured of such material; but it is absolutely necessary for the making of good ware that the glass should be as clear of foreign matter as it is possible to make it, preference being given to that taken from the bottom of the mass over that gathered from its surface, for as the surface is exposed to the direct action of the flame, it is at all times more or less suffused or covered by a coating of fine ashes, small cinders, smoke, and other noxious substances that seriously interfere with its proper working.

To keep back this floating foreign matter that operates against the production of good ware and enable us to work comparatively pure glass from an open basin, is the principal object of our invention, and to this end we have contrived and applied a system of screens that, without interfering with the draught of the furnace, successfully accomplishes the purposes for which they are intended. Each of these screens consists of a strong heat-sustaining tube, N, open at both ends, and of requisite diameter to readily and easily admit of the glass being gathered and taken out through them, and long enough to extend through the walls of the furnace at an angle of about forty-five degrees down into the molten glass, so that their inner ends will be near the bottom of the working-basin G, leaving but a small space or opening beneath, through which the molten glass may enter, and rising, find its level with that in the basin, so that it may be gathered and taken out through the tubes N in the same manner and to the same extent as from an ordinary "covered pot," free from glass-gall, ashes, cinders, and smoke, or the usual impurities that in passing over the glass are disposed to lodge upon its surface. To make these tubes secure within the wall the outside end of each is formed with a flaring mouth, S, that prevents them from falling inward, and constitutes a flange by which they may be readily withdrawn in case of breakage, so as to admit of being replaced by others.

*Claim.*

We claim—

Combining, with a furnace used for melting glass, one or more tubular screens, N, arranged at such an angle or inclination with relation to the horizontal plane of the working-basin G as to extend through the outside walls of the furnace into and near the bottom of the glass, substantially in the manner shown, for the purposes hereinbefore set forth.

JOSIAH W. ELLS.
JOHN J. DEABOLD.

Witnesses:
GEORGE C. STEWART,
N. C. PRICE.